(12) United States Patent
Watanabe

(10) Patent No.: US 7,154,240 B2
(45) Date of Patent: Dec. 26, 2006

(54) LOAD-DRIVING DEVICE AND METHOD OF DRIVING LOAD

(75) Inventor: Hideo Watanabe, Kariya (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 11/067,735

(22) Filed: Mar. 1, 2005

(65) Prior Publication Data

US 2005/0194998 A1    Sep. 8, 2005

(30) Foreign Application Priority Data

Mar. 3, 2004   (JP) .............................. 2004-059026
Dec. 7, 2004   (JP) .............................. 2004-354232

(51) Int. Cl.
  *H02P 7/06*   (2006.01)
(52) U.S. Cl. ...................... 318/434; 318/432; 318/433; 323/274; 323/284
(58) Field of Classification Search ................ 318/434, 318/433, 432; 323/274, 284
See application file for complete search history.

(56) References Cited

U.S. PATENT DOCUMENTS

| | | | | |
|---|---|---|---|---|
| 4,270,164 A | * | 5/1981 | Wyman et al. | ........... 363/56.03 |
| 4,628,235 A | * | 12/1986 | Goings | ........................ 318/430 |
| 5,192,901 A | * | 3/1993 | Gontowski, Jr. | ............. 318/430 |
| 5,303,156 A | * | 4/1994 | Matsuoka et al. | ............. 701/43 |
| 6,170,241 B1 | * | 1/2001 | Shibilski et al. | ............. 56/11.9 |
| 6,545,513 B1 | * | 4/2003 | Tsuchida et al. | ............. 327/108 |
| 7,079,368 B1 | * | 7/2006 | Ishikawa et al. | ........... 361/93.1 |

FOREIGN PATENT DOCUMENTS

JP    B2-8-34222    9/1988

* cited by examiner

*Primary Examiner*—Rita Leykin
(74) *Attorney, Agent, or Firm*—Posz Law Group, PLC

(57) ABSTRACT

A device for driving a load such as an electric motor for driving a fan mounted on an automobile includes a semiconductor power FET for supplying a load current to the load, a voltage detector for detecting a load voltage, a current detector for detecting a load current and a control circuit for controlling an amount of the load current. The load current is limited to a first limiting level when the detected load current exceeds a predetermined current level, and to a second limiting level, which is lower than the first limiting level, when the load current exceeds the predetermined current level and the load voltage becomes lower than a predetermined voltage level. By limiting the amount of load current, the power FET is surely prevented from being damaged by over-current even if a circuit including the load is short-circuited.

14 Claims, 9 Drawing Sheets

LOAD-DRIVING DEVICE AND METHOD OF DRIVING LOAD

CROSS-REFERENCE TO RELATED APPLICATION

This application is based upon and claims benefit of priority of Japanese Patent Applications No. 2004-59026 filed on Mar. 3, 2004 and No. 2004-354232 filed on Dec. 7, 2004, the contents of which are incorporated herein by reference.

BACKGROUND OF THE INVENTION

1. Field of the Invention

The present invention relates to a device for driving a load such as a cooling fan motor mounted on an automotive vehicle and to a method of driving such a load.

2. Description of Related Art

A motor for driving a cooling fan or a blower is mounted on an automotive vehicle. An example of a device for driving such a motor is shown in FIG. 14. Between a plus terminal of a battery 1 and a ground, a fuse 2, a DC motor 3 (a fan-motor), an N-channel power MOSFET 4 (a switching element) and a current detecting resistor 5 are connected in series. The DC motor 3 drives a cooling fan (not shown). The load-driving device 11 includes the power MOSFET 4, the current detecting resister 5, an input signal circuit 6, a driving circuit 7, a load voltage detector 8 (Vm detector), a load current detector 9 (Im detector) and a control circuit 10.

A control signal S1 is fed to the input signal circuit 6 from an electronic control unit (ECU, not shown) that controls operation of an on-board air-conditioner. The air-conditioner ECU outputs the control signal S1 in a form of a pulse-width-modulated signal (PWM) on a carrier wave of 5 kHz, for example. The input signal circuit 6 performs a frequency-to-voltage conversion (F/V conversion) to obtain a voltage signal to be fed to the driving circuit 7. The driving circuit 7 outputs a driving signal according to the voltage signal supplied from the input signal circuit 6. The driving signal is fed to a gate of the FET 4 which controls a load voltage Vm imposed on the motor 3 according to the driving signal fed from the driving circuit 7. The load voltage Vm is expressed in a formula: Vm=(+B)−Vm(−), where (+B) is a terminal voltage of the battery 1, and Vm(−) is a drain voltage of the FET 4 or a voltage at a minus terminal of the motor 3.

The load voltage Vm is controlled to a target load voltage Vt based on the driving signal fed from the driving circuit 7 to the FET 4. A load current detector 9 (Im detector) is connected across the current detecting resistor 5 having a resistance r, and the load current detector 9 detects an amount of current flowing through the resistor 5 based on a voltage across the resistor 5. A voltage Vr (a voltage across the resistor 5 representing the load current Im) is fed to the control circuit 10. The control circuit 10 functions as a protecting circuit for preventing the FET 4 from being damaged due to over-current flowing therethrough. For example, the control circuit 10 gives a command to the driving circuit 7 to decrease the level of the driving signal fed to the FET 4 to thereby limit the load current Im, when the load current Im detected by the current detector 9 becomes larger than a predetermined threshold level. An example of the circuit for protecting the FET 4 from over-current is shown in JP-B2-8-34222.

The device for driving the fan-motor 3 has to supply a certain amount of current to the motor when the motor is temporarily locked due to a low temperature to break the frozen state by giving a torque to a rotor of the motor. Therefore, the amount of the load current is limited only to a certain level for protecting the FET 4 from over-current in the conventional device. However, in the case where the motor is short-circuited and the load current reaches a very high level, there is a possibility that the FET is not sufficiently protected in the conventional device.

SUMMARY OF THE INVENTION

The present invention has been made in view of the above-mentioned problem, and an object of the present invention is to provide an improved load-driving device in which the FET is surely protected even when a short circuit in the load occurs and to provide a method of surely protecting the FET used in the device.

The load-driving device according to the present invention drives a load, such as a DC motor for driving a fan or a blower mounted on an automotive vehicle. The load-driving device includes a semiconductor element such as a power FET connected in series to the load, a voltage detector for detecting a load voltage applied to the load, a current detector for detecting a load current flowing through the load, and a control circuit for controlling an amount of current supplied to the load. The amount of load current flowing through the power FET is controlled by changing a gate voltage fed to a gate of the power FET. The gate voltage is controlled by the control circuit based on the load voltage and the load current.

When the detected load current exceeds a predetermined current level, the load current is limited to a first limiting level. When the detected load current exceeds a predetermined current level and the detected load voltage becomes lower than a predetermined voltage level, the load current is limited to a second limiting level that is lower than the first limiting level. Further, if the load current continues to exceed the predetermined current level for a certain period, current supply to the load is terminated. In this manner, the power FET is surely prevented from being damaged by an over-current.

As the condition for limiting the load current to the second limiting level, a resistance of the load may be used. In this case, the load current is limited to the second limiting level when the load resistance becomes lower than a predetermined level. The load resistance can be detected based on the load current and the load voltage. The load current may be detected based on a voltage across a resistor through which the load current flows.

Other objects and features of the present invention will become more readily apparent from a better understanding of the preferred embodiments described below with reference to the following drawings.

DETAILED DESCRIPTION OF THE PREFERRED EMBODIMENTS

Figure 1:
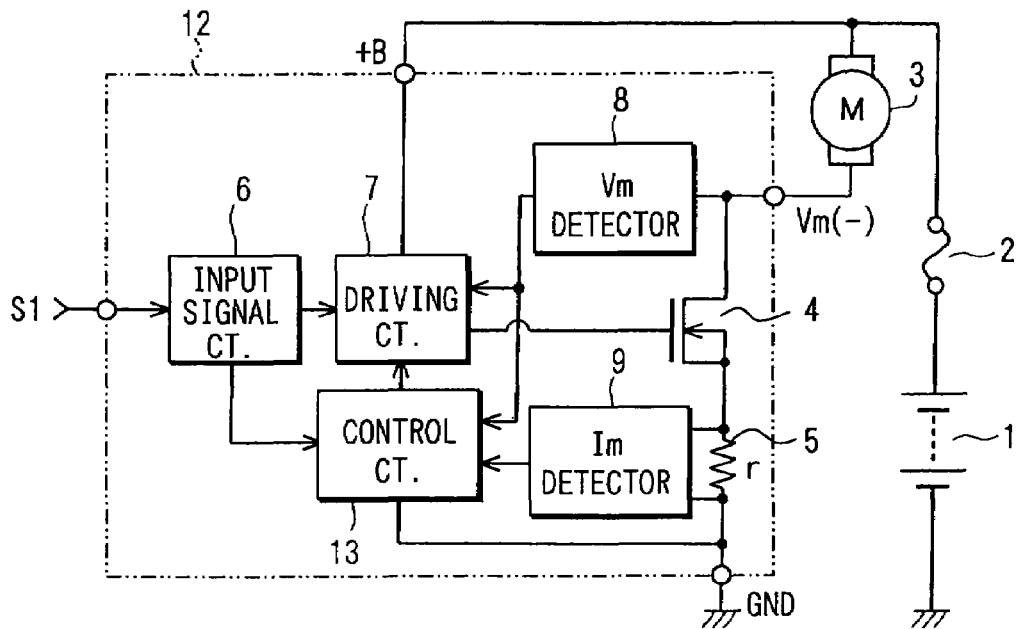
FIG. 1 is a block diagram showing a load-driving device as a first embodiment of the present invention.
Figure 14:
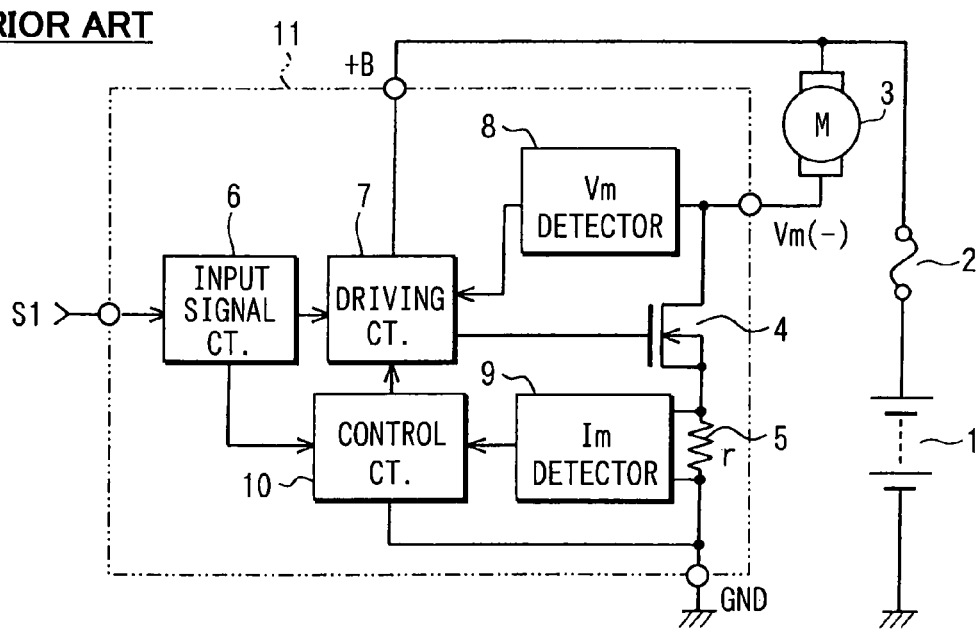
FIG. 14 is a block diagram showing a conventional load-driving device.

A first embodiment of the present invention will be described with reference to FIGS. 1–4. A load-driving system 12 shown in FIG. 1 drives a motor 3 for a fan (referred to as a fan-motor) mounted on an automotive vehicle. In FIG. 1, the same blocks or the same components as those shown in FIG. 14 have the same reference numbers, and explanation for the same portions is not repeated here. An output signal from the load voltage detector 8 (Vm detector) is also fed to the control circuit 13 in this first embodiment. In other words, the output signal from the Vm detector 8 is fed to both the driving circuit 7 and the control circuit 13. The control circuit 13 operates based on both signals fed from the Vm detector 8 and the load current detector 9 (Im detector).

Figure 2:
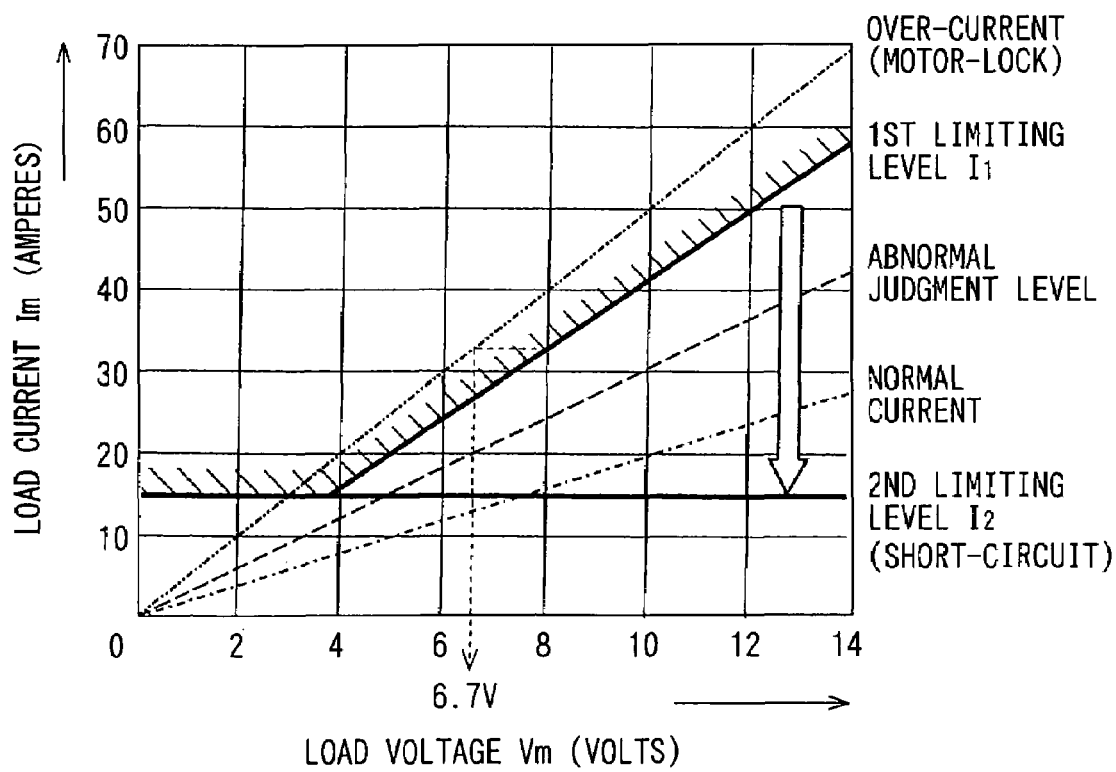
FIG. 2 is a graph showing various current levels in protecting an FET from over-current.
Figure 3:
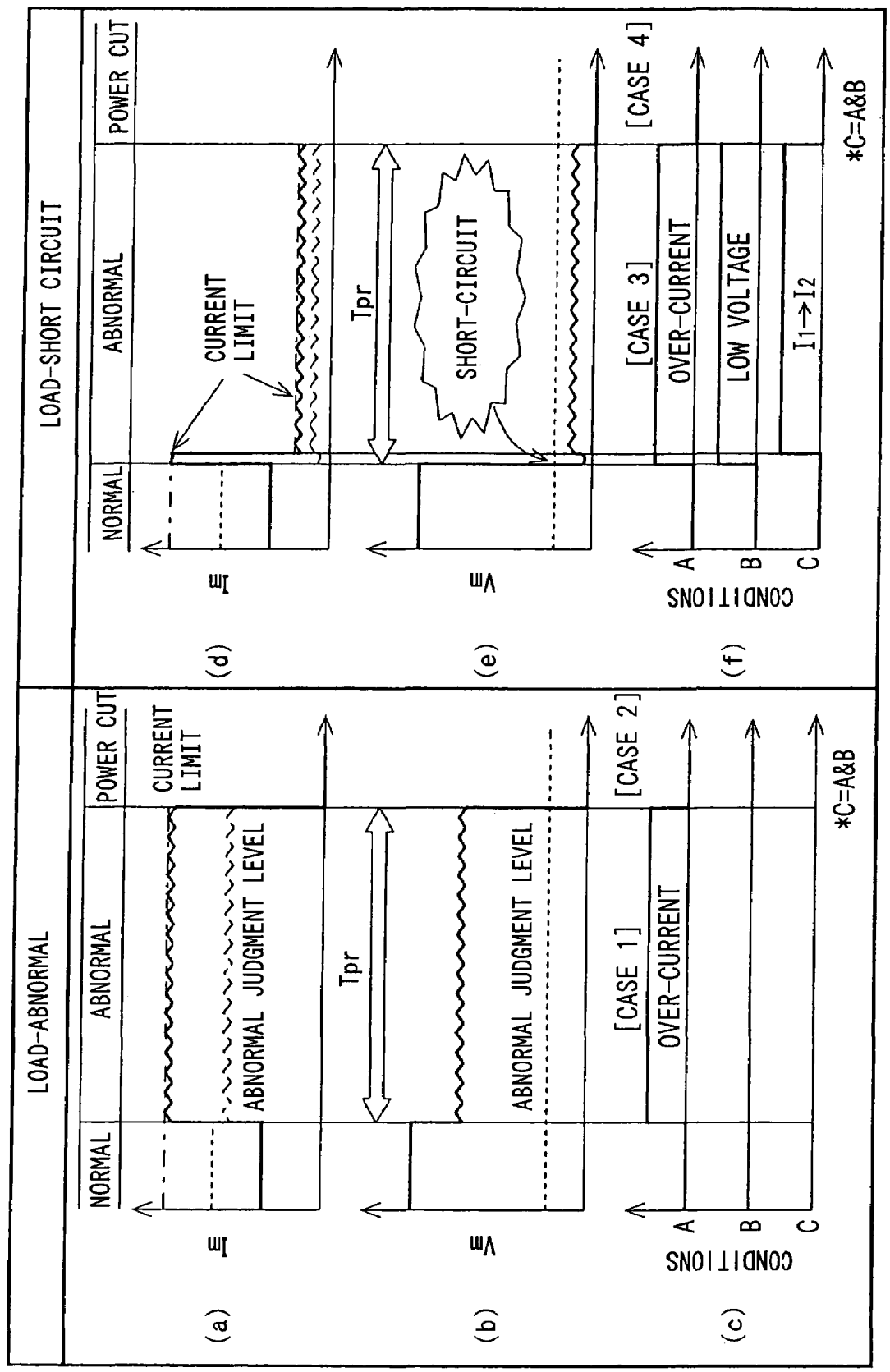
FIG. 3 is a graph showing load current and load voltage in various cases where current-limiting operation is performed.
Figure 4:
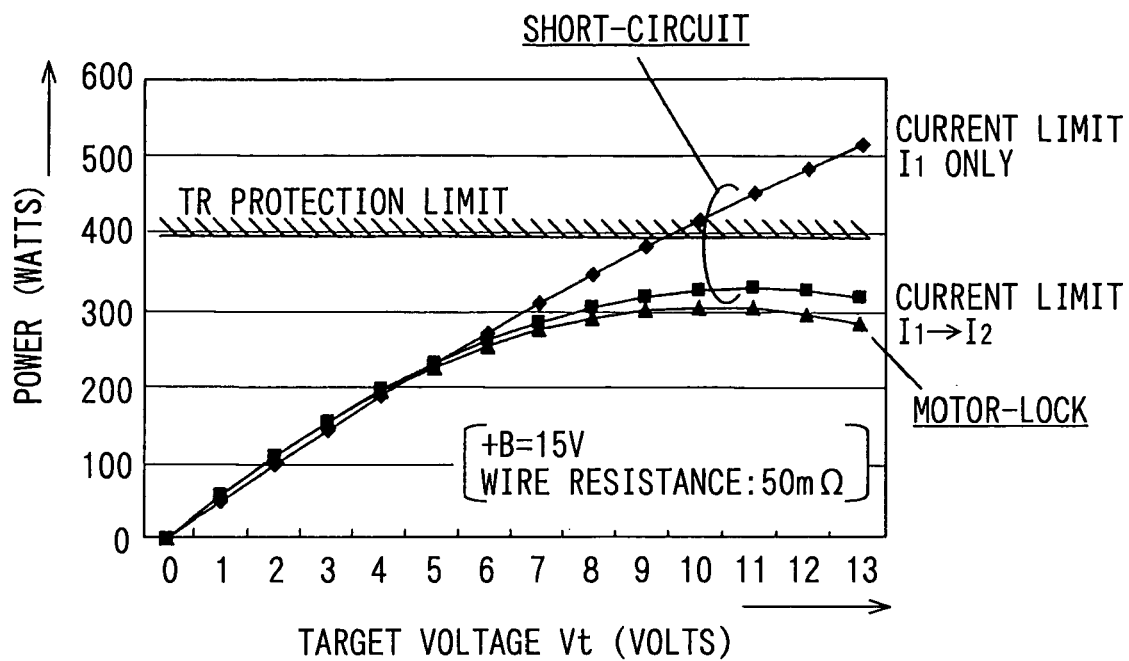
FIG. 4 is a graph showing an amount of power consumed in an FET when an amount of load current is limited to one level and to two levels.

Operation of the load-driving device 12 shown in FIG. 1 will be described, also referring to FIGS. 2, 3 and 4. In FIG. 2, the voltage applied to the motor 3 (the load voltage Vm; Vm=+B−Vm(−), where +B is a terminal voltage of the battery 1 and Vm(−) is a voltage at a minus terminal of the motor 3) is shown on the abscissa, and the load current Im flowing through the motor 3 is shown on ordinate. FIG. 2 is used as a data table in current control operation of the control circuit 13. In FIG. 3, the load voltage Vm and the load current Im under various cases are shown. In FIG. 4, amounts of power consumed in the FET 4 under various control conditions are shown.

In this particular embodiment, when the electronic control unit (ECU) orders to set a target voltage Vt to be applied to the motor 3 to 8 volts, a normal load current is 15 amperes and an over-current at a motor-lock is 40 amperes if the load current is not controlled. The control circuit 13 suppresses load current Im to 33 amperes (a first limiting level $I_1$) at the motor-lock (Load-Abnormal in FIG. 3), and accordingly the load voltage Vm decreases to 6.7 volts that corresponds to the load current 33 amperes (this case is referred to as case 1). Further, the control circuit 13 cuts off the current supply to the motor 3 when the over-current situation has continued for a predetermined period Tpr (case 2). The above-explained control for the case 1 and the case 2 has been performed in the conventional load-driving device 11 shown in FIG. 14.

In the load-driving device 12 according to the present invention, the control circuit 13 further performs the following control. When the load voltage Vm drops to a very low level, e.g., 2 volts (Load-Short Circuit in FIG. 3) under the situation where the over-current occurred, the control circuit 13 decreases the load current Im to 15 amperes (a second limiting level $I_2$) not withstanding the target voltage Vt directed by the ECU (case 3). Further, when this situation (case 3 situation) has continued for a predetermined period Tpr, the current supply to the motor 3 is cut off (case 4).

FIGS. 3($a$), ($b$) and ($c$) show the load current Im, the load voltage Vm and control conditions, respectively, under the case 1 and the case 2. Similarly, ($d$), ($e$) and ($f$) show Im, Vm and control conditions, respectively, under the case 3 and the case 4. In ($c$) and ($f$), a control condition A is a detection of an over-current (motor-lock), a control condition B is a detection of a very low load voltage (short-circuit), and a control condition C is a logical product of the condition A and the condition B (C=A & B). When the control condition C is satisfied, the limiting level of the load current Im is changed from the first limiting level $I_1$ to the second limiting level $I_2$.

FIG. 4 shows an amount of power consumption in the FET 4, which is simulated assuming that the battery voltage +B is 15 volts and a wiring resistance is 50 milliohms. As seen in the graph, when the load current Im is limited only to the first limiting level $I_1$, the power consumption in the FET 4 exceeds 400 watts under a target voltage Vt higher than 10 volts if short-circuit occurs. On the other hand, when the load current Im is further reduced to the second limiting level $I_2$ at the short-circuit, the amount of power consumption in the FET 4 becomes as low as the level of the motor-lock.

According to the present invention, the amount of load current Im is controlled by the control circuit 13 based on both of the detected load voltage and the load current. More particularly, the load current Im is limited to the first limiting level $I_1$ when the motor 3 is locked, and to the second limiting level $I_2$, which is considerably lower than the first limiting level $I_1$, when the motor is short-circuited. In this manner, the power consumption in the FET 4 is suppressed to an allowable level even when the short-circuit in the load occurs. Thus, the FET 4 is surely protected. Further, when the motor-lock or the short-circuit continues for a predetermined period, the current supply to the FET 4 is cut off to protect the FET 4 without fail.

The load-driving device of the present invention is advantageously used for driving a fan-motor mounted on an automobile. There is a possibility that the fan-motor is locked by freezing when it is used at a low temperature. It is not preferable to cut the power supply immediately when the motor-lock is found because the motor-lock may be broken by generating a rotor torque by supplying a certain amount of current. According to the present invention, an allowable amount of current is supplied in such a motor-lock situation.

Figure 5:
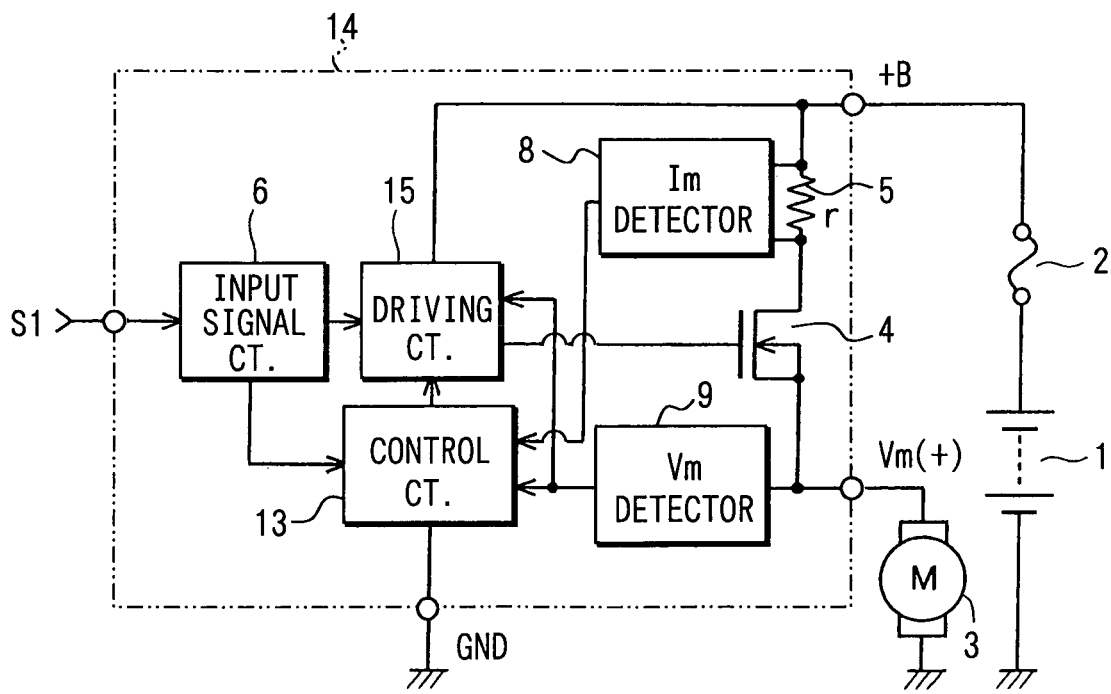
FIG. 5 is a block diagram showing a load-driving device as a second embodiment of the present invention.

A second embodiment of the present invention will be described with reference to FIG. 5. A load-driving device 14 as the second embodiment is similar to the first embodiment described above except that the FET 4 is connected to the high side (a plus terminal) of the motor 3. This connection is referred to as a high side drive as opposed to a low side drive which is the case in the first embodiment. Further, this driving system is also referred to as a high side linear drive, because the motor 3 is driven by supplying a linear current as opposed to a pulse current.

The load voltage detector 8 detects the load voltage Vm (Vm=+B−Vm(+)) by detecting a voltage Vm(+) at a plus terminal of the motor 3. A driving circuit 15 includes a booster circuit because the driving circuit 15 drives the FET 4 at the high side. A driving signal generated in the driving circuit 15 is fed to the base of the FET 4. This embodiment operates in the same manner as the first embodiment, and the same advantages are attained. In the high side drive, there is a possibility that a wire connected to the plus terminal of the motor 3 may be inadvertently grounded due to a failure in mounting operation. The FET 4 is properly protected in such a situation, too.

Figure 6:
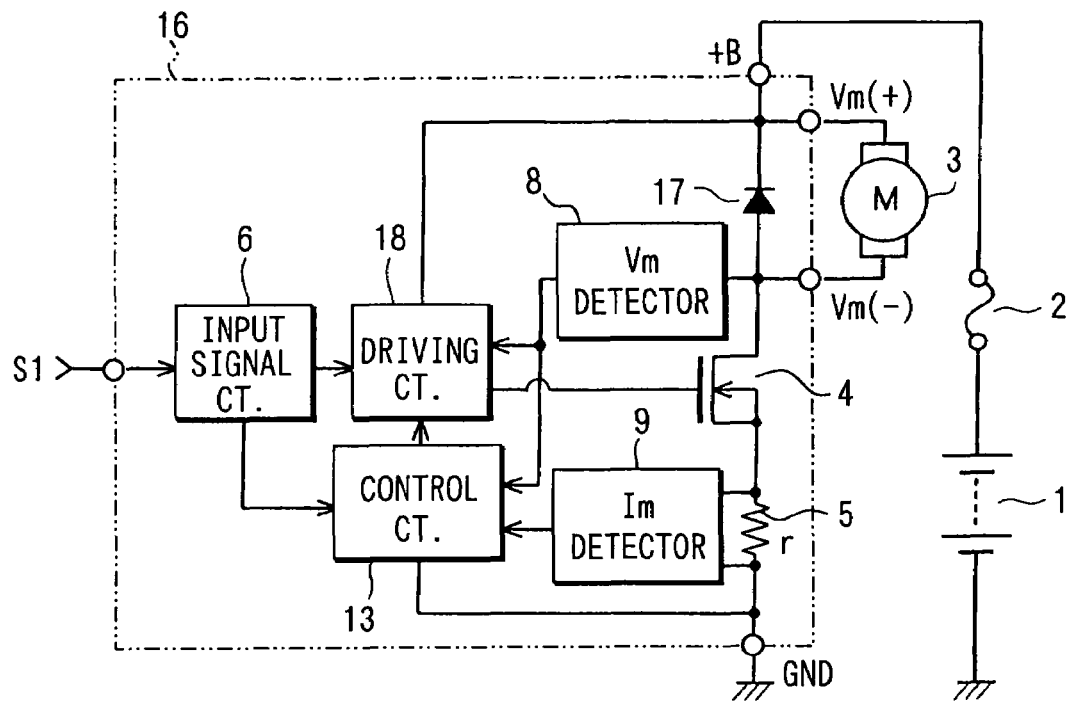
FIG. 6 is a block diagram showing a load-driving device as a third embodiment of the present invention.

A third embodiment of the present invention will be described with reference to FIGS. 6 and 7. A load-driving device 16 as the third embodiment of the present invention is similar to the first embodiment except that a so-called low side pulse drive is employed in this embodiment. A flywheel diode 17 is connected in parallel to the motor 3, and a driving circuit 18 outputs a driving signal in a form of a pulse-width-modulated (PWM) signal having a duty ratio determined according to a control signal fed from the input signal circuit 6. The FET 4 is controlled based on the PWM signal fed from the driving circuit 18. Other structures are the same as those of the first embodiment.

Figure 7:
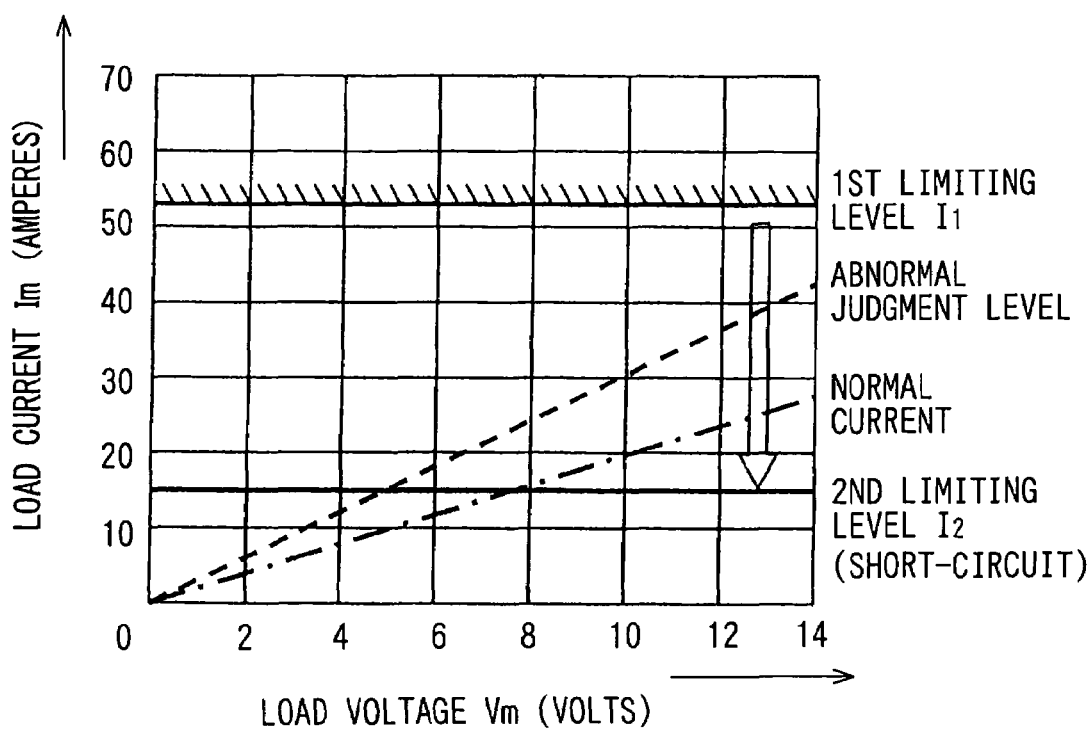
FIG. 7 is a graph showing a first and a second level for limiting an amount of load current in the third embodiment.

FIG. 7 shows a first limiting level $I_1$ and a second limiting level $I_2$ for the load current Im, which are used in the third embodiment. The first limiting level $I_1$ is set to about 53 amperes which is higher than 33 amperes set in the first embodiment. Since power consumption in the FET 4 is lower in the pulse drive compared with that of the linear drive, the first limiting level $I_1$ can be set to a higher level. This is advantageous to break the motor-lock due to freezing. The second limiting level $I_2$ is set to the same level as that of the first embodiment. Similar advantages as those of the first embodiment are attained in this embodiment, too.

Figure 8:
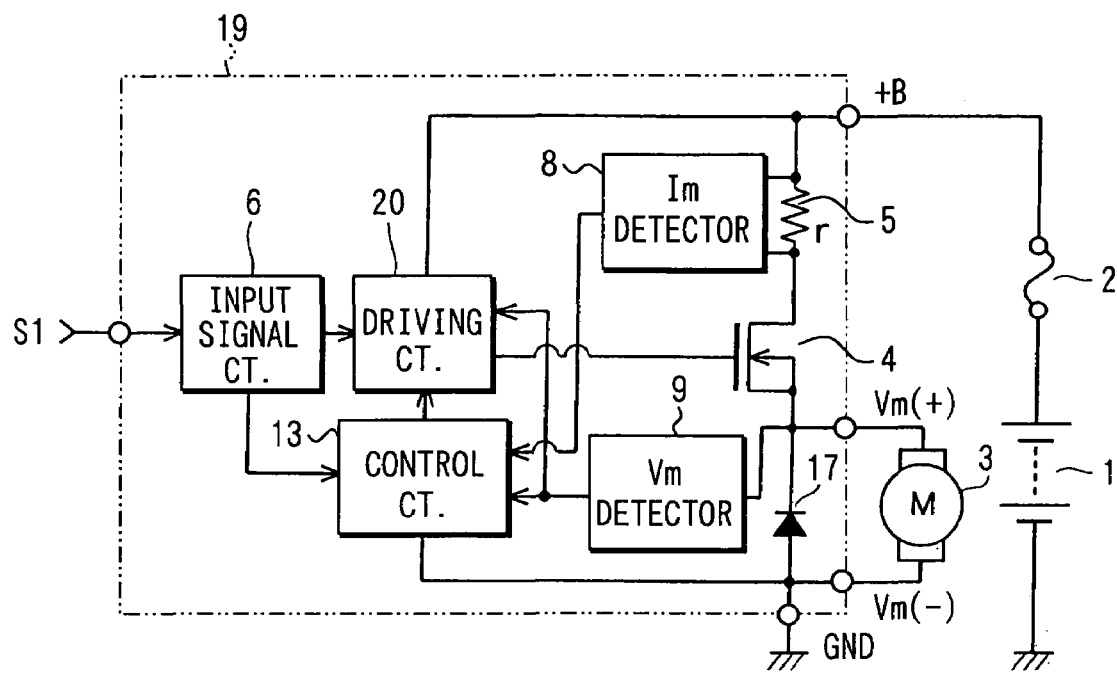
FIG. 8 is a block diagram showing a load-driving device as a fourth embodiment of the present invention.

A fourth embodiment of the present invention is shown in FIG. 8. A load-driving circuit 19 as the fourth embodiment is similar to the third embodiment described above, except that the high side pulse drive is employed in this embodiment in place of the low side pulse drive employed in the third embodiment. The FET 4 is connected to the high side of the motor 3, and a flywheel diode 17 is connected in parallel to the motor 3. A driving circuit 20 generates a PWM driving signal and supplies it to the gate of the FET 4. Other structures and operation are the same as those of the third embodiment, and the same advantages are obtained in this embodiment, too.

Figure 9:
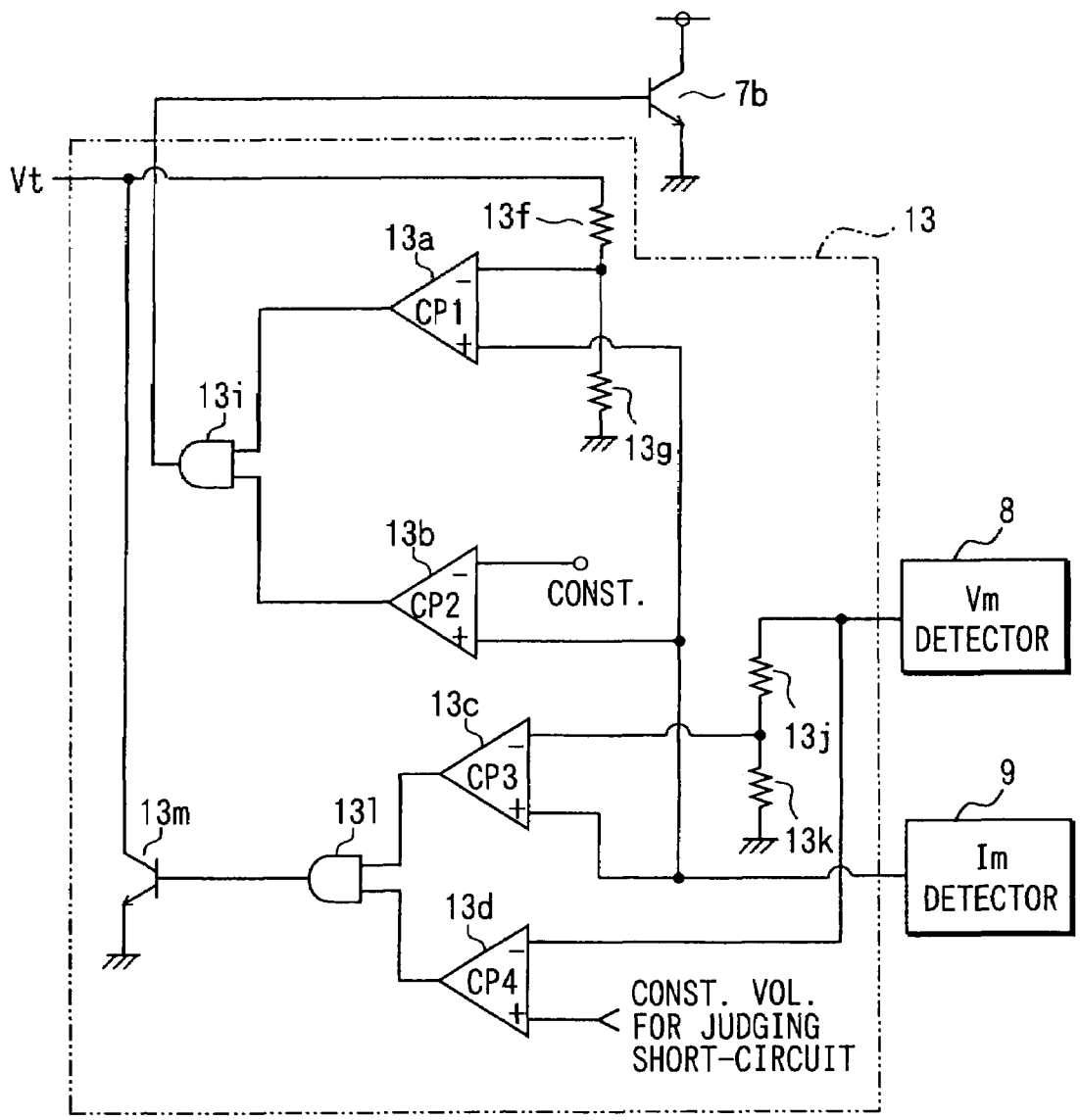
FIG. 9 is a circuit diagram showing a control circuit in a load-driving device as a fifth embodiment of the present invention.
Figure 10:
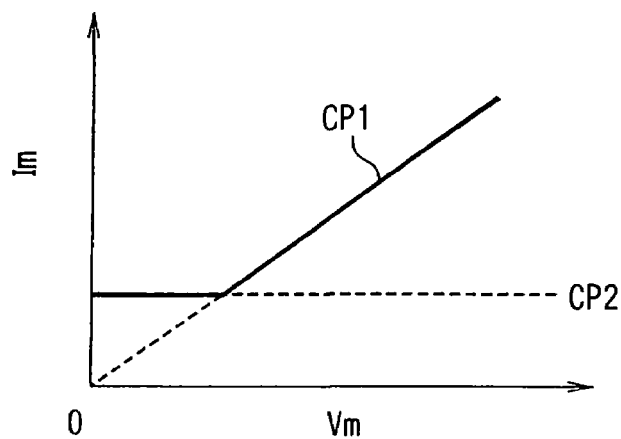
FIG. 10 is a graph showing a first level and a second level for limiting an amount of load current in the load-driving device as the fifth embodiment.
Figure 11:
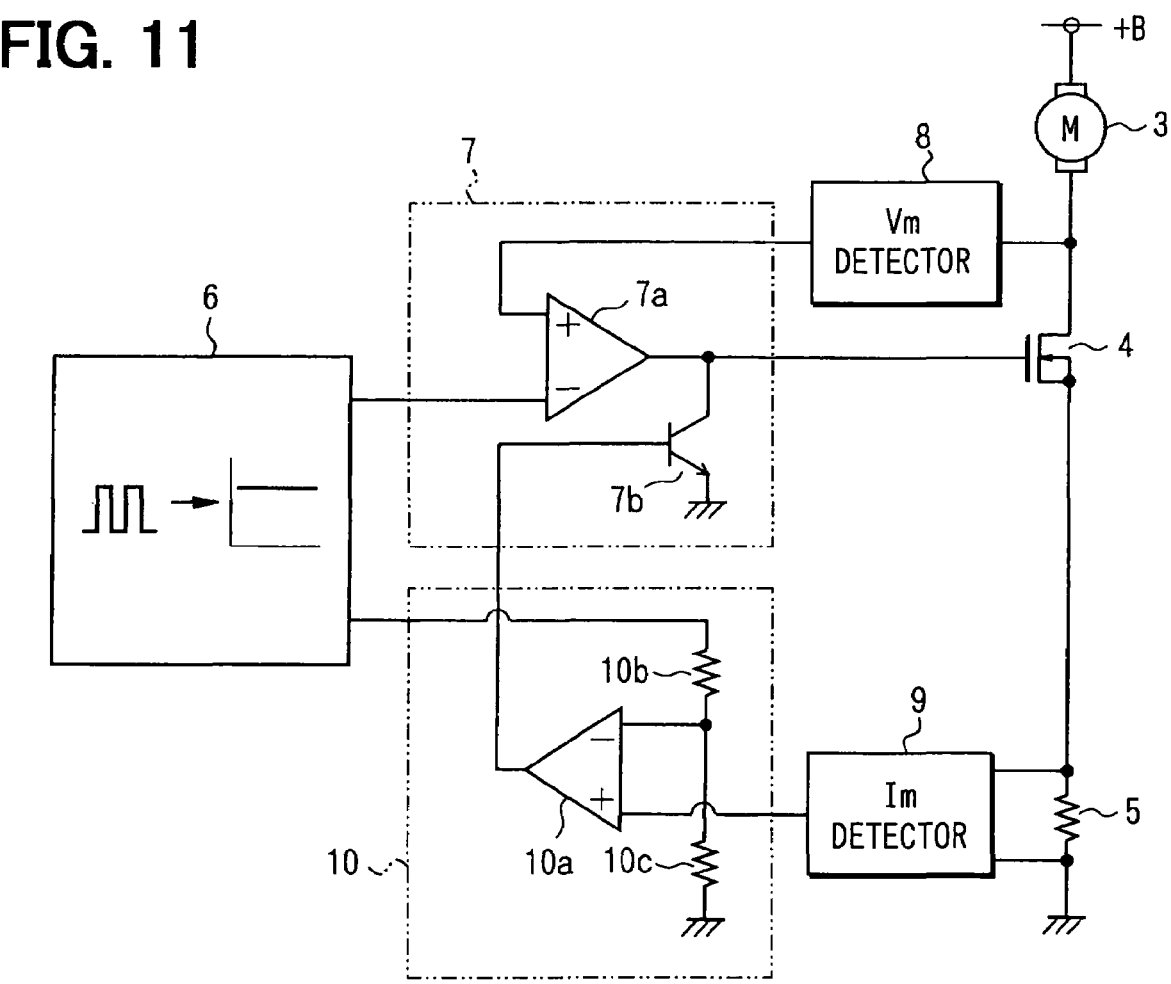
FIG. 11 is a circuit diagram showing a driving circuit and a control circuit in the load-driving device as the fifth embodiment.

A fifth embodiment of the present invention will be described with reference to FIGS. 9–11. Though an entire structure of the load-driving device is the same as that of the first embodiment, the control circuit 13 is structured as shown in FIG. 9. FIG. 10 shows a first limiting level $I_1$ and a second limiting level $I_2$ used in the fifth embodiment. FIG. 11 shows a circuit structure corresponding to a conventional load-driving device 11 shown in FIG. 14.

As shown in FIG. 11, the driving circuit 7 and the control circuit 10 include an operational amplifier 7a and a comparator 10a, respectively. A target load voltage Vt obtained by F/V conversion in the input signal circuit 6 is fed to an inverse input terminal of the operational amplifier 7a. On the other hand, a voltage Vtd obtained by dividing the target load voltage Vt with dividing resistors 10b, 10c is fed to an inverse input terminal of the comparator 10a. An output signal from the Im detector 9 is fed to a non-inverse terminal of the comparator 10a. An output signal from the Vm detector 8 is fed to a non-inverse input terminal of the operational amplifier 7a, and the output terminal of the operational amplifier 7a is connected to the gate of the FET 4. That is, the operational amplifier 7a outputs a voltage corresponding to a difference between the detected load voltage Vm and the target voltage Vt, and this voltage is supplied to the gate of the FET 4.

A collector of an NPN transistor 7b is connected to the output terminal of the operational amplifier 7a, an emitter of the transistor 7b is grounded, and a base of the transistor 7b is connected to an output terminal of the comparator 10a. The control circuit 10 generates an over-current threshold Ith based on the target load voltage Vt, and the transistor 7b is turned on to cut off current supply to the motor 3 when the load current Im detected by the Im detector 9 exceeds the over-current threshold Ith. Once the current supply to the motor 3 is cut off, the amount of load current Im detected by the Im detector 9 decreases. As a result, the output of the comparator 10a becomes a low level, and the transistor 7b is turned off to thereby resume current supply to the motor 3. This means that the transistor 7b repeats turning on and off, and thereby a limiting level for the load current Im is determined.

Now, referring to FIG. 9 the structure of the control circuit 13 will be described. The control circuit 13 includes four comparators 13a–13d (CP1–CP4). The comparator 13a and dividing resistors 13f, 13g perform the same function as the control circuit 10 shown in FIG. 11. That is, a first limiting level for the load current is set by the CP1 when an over-current is detected (refer to the first limiting level labeled as CP1 in FIG. 10). A constant threshold voltage is fed to an inverse input terminal of the comparator 13b, and load current Im detected by the Im detector 9 is fed to a non-inverse input terminal of the comparator 13b. Thus, the second limiting level for the load current and a limiting level in a region where Vm and Im are low are set by the CP2 (refer to the second limiting level labeled as CP2 in FIG. 10). The output terminal of the comparator 13a and the output terminal of the comparator 13b are connected to input terminals of an AND gate 13i, and the output terminal of the AND gate 13i is connected to the base of the NPN transistor 7b which is included in the driving circuit 7 of the load-driving device 12.

A divided load voltage Vmd obtained by dividing the load voltage Vm detected by the Vm detector 8 with dividing resistors 13j, 13k is fed to an inverse input terminal of the comparator 13c, and a load current Im detected by the Im detector 9 is fed to a non-inverse input terminal of the comparator 13c. That is, an over-current situation is detected by the CP3. On the other hand, the load voltage Vm is directly fed to an inverse input terminal of the comparator 13d, and a constant voltage for judging a short-circuit is fed to a non-inverse input terminal of the comparator 13d. That is, a short-circuit situation is detected by the CP4. The outputs from the comparators 13c, 13d are fed to an AND gate 13l, and the output terminal of the AND gate 13l is connected to a gate of an NPN transistor 13m. The target load voltage Vt is fed to a collector of the transistor 13m, and its emitter is grounded.

Referring to FIG. 10, operation of the control circuit 13 will be explained. In the region where Vm and Im are low (where CP2>CP1), the output of the comparator 13a is always H (high level), and the constant threshold level of the comparator 13b is effective. In the region where Vm and Im are high (where CP1≧CP2), the output of the comparator 13b is always H, and the threshold level of the comparator 13a is effective and the limiting level linearly increases.

When the comparator 13c detects the over-current situation and the comparator 13d detects the short-circuit situation, the output of the AND gate 13l becomes H to turn on the transistor 13m. Upon turning on the transistor 13m, the threshold level of the comparator 13a becomes a ground level. Accordingly, the output of the comparator 13a becomes H, and the constant threshold level of the comparator 13b becomes effective. Thus, the load current limiting operation is performed as shown in FIG. 2.

Figure 12:
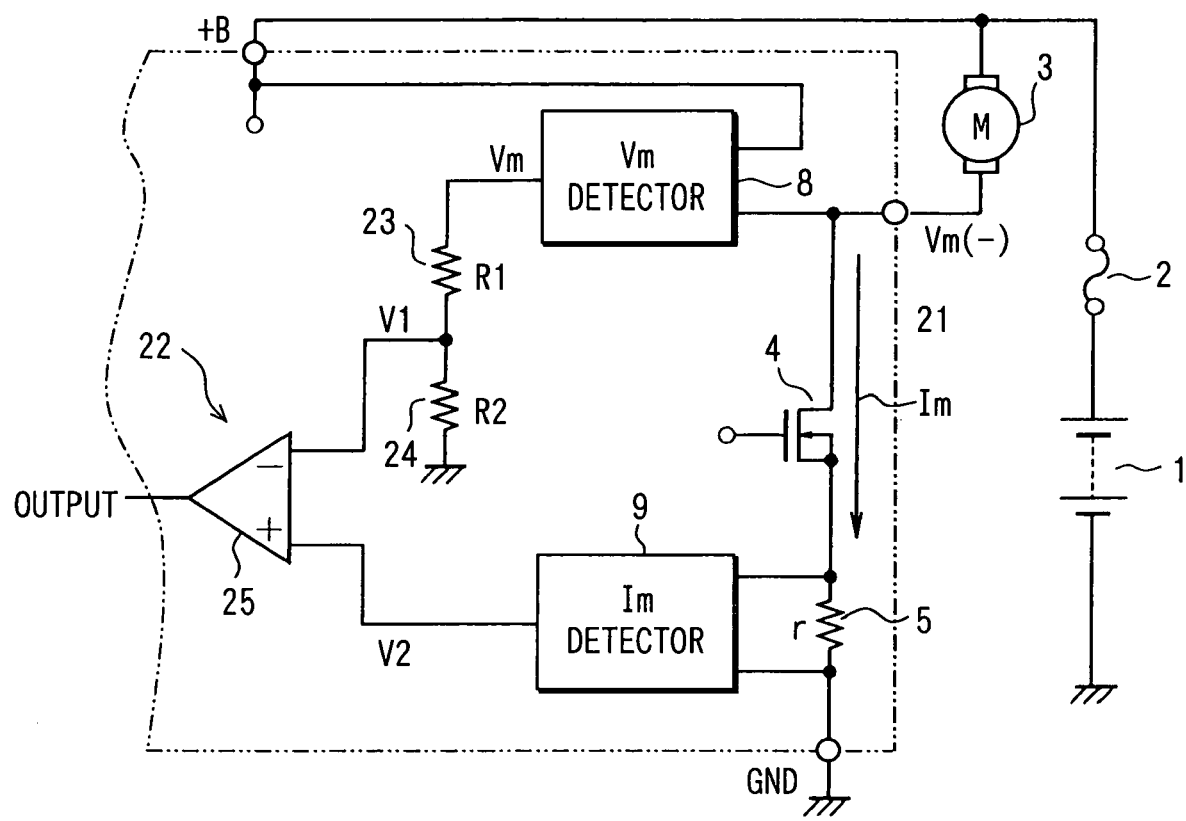
FIG. 12 is a circuit diagram showing an essential portion of a load-driving device as a sixth embodiment of the present invention.

Referring to FIG. 12, a sixth embodiment of the present invention will be described. In FIG. 12, the control circuit 13 used in the foregoing embodiments is replaced with a control circuit 22. In the foregoing embodiments (the first to fifth embodiments), when the load current Im reaches a threshold level, the load current Im is limited to the first limiting level. Further, when the load voltage Vm decreases below a threshold level, the load current Im is limited to the second limiting level which is lower than the first limiting level. To set the threshold levels, it is required to take into consideration a wiring resistance in the current supply circuit because there occurs a considerable amount of voltage drop due to a high amount of current, and the threshold levels have to be set to respective systems.

In a load-driving device 21 as the sixth embodiment, a load resistance Rm is detected based on the load voltage and the load current, and when the load resistance decreases to a predetermined level, the load current is limited to a certain level. The load resistance Rm is detected in the following manner. As shown in FIG. 12, the load voltage Vm is divided by dividing resistors 23, 24 to obtain a divided voltage V1, and the divided voltage V1 is fed to an inverse input terminal of a comparator 25. A voltage V2 corresponding to the load current Im detected by the Im detector 9 is fed to a non-inverse input terminal of the comparator 25. The comparator 25 outputs a high level signal H when V2 becomes higher than V1 (V2>V). In other words, the comparator 25 replaces the comparator 13d of the fifth embodiment.

The load resistance Rm and the voltages V1, V2 are expressed in the following formulae: $Rm = Vm/Im$; $V1 = Vm \cdot R2/(R1+R2)$; and $V2 = r \cdot Im$, where R1 and R2 are the dividing resistances of the dividing resistors 23 and 24, respectively, and r is a resistance of the resistor 5. When V1 is equal to V2, $Rm = r \cdot (R1+R2)/R2$. When Rm becomes lower than this value, V2 becomes higher than V1, and the output of the comparator 25 becomes H. Thus, the decrease of the load resistance Rm to a predetermined level is detected, and in this case, an amount of the load current Im is limited to the second limiting level $I_2$.

In the sixth embodiment, the decrease in the load resistance Rm is detected based on the voltages detected by the Vm detector 8 and the Im detector 9, and the load current Im is limited to the second limiting level $I_2$ when the load resistance Rm becomes lower than a threshold level. Therefore, it is not necessary to set the threshold voltage for limiting the load current Im to the second limiting level $I_2$ taking into consideration the voltage drop due to the wiring resistance in the current supply circuit. The threshold level of the load resistance Rm can be easily set by the resistances r, R1 and R2.

Figure 13:
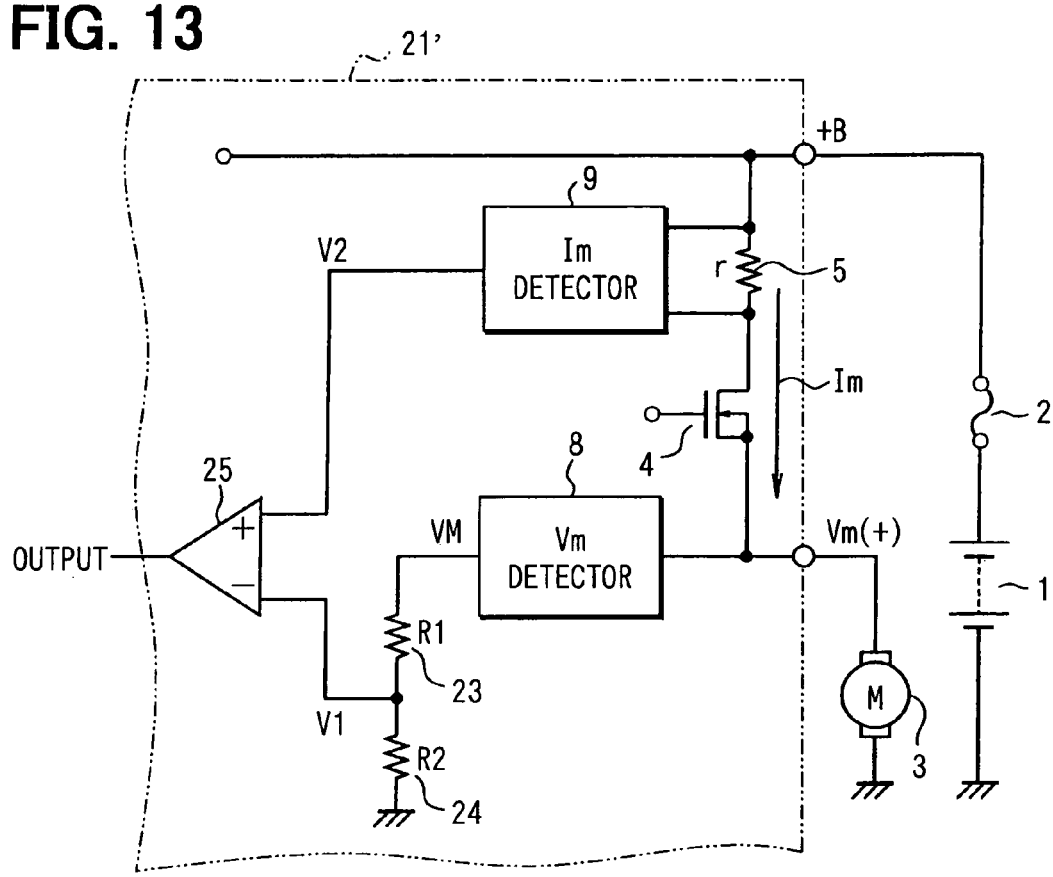
FIG. 13 is a circuit diagram showing an essential portion of a load-driving device as a seventh embodiment of the present invention.

FIG. 13 shows a seventh embodiment of the present invention. In this embodiment, a high side drive is employed in place of the low side drive employed in the sixth embodiment. Other structures and functions are the same as those of the sixth embodiment, and the same advantages as in the sixth embodiment are attained in this embodiment, too.

The present invention is not limited to the embodiments described above, but it maybe variously modified. For example, cutting-off of the current supply to the load under the situation where the over-current continues for a certain period may be performed when such is necessary. The N-channel power MOSFET 4 used in the foregoing embodiments may be replaced with a P-channel power MOSFET when the high side drive is employed. Alternatively, a bipolar transistor or an IGBT may be used in place of the MOSFET. In the case where the pulse drive is employed, an amount of current supplied to a load may be detected based on an ON-voltage of an FET, which is a product of ON-resistance of the FET and an amount of the load current Im. The load driven by the device of the present invention is not limited to the DC motor 3, but other loads to which current is supplied through a semiconductor element may be driven. When the pulse drive is employed, the threshold level of the load current may be made constant without depending on the target voltage signal fed from the input signal circuit 6, because power consumption is relatively low in the case of the pulse drive. Though the load current is limited only to the second limiting level in the sixth and the seventh embodiment, it is also possible to limit the load current to two levels using one more comparator corresponding to the first limiting level.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A load-driving device comprising:
   a semiconductor element connected in series to a load for supplying a driving current thereto in a controlled manner;
   a current detector for detecting an amount of a load current supplied to the load;
   a voltage detector for detecting a load voltage applied to the load; and
   means for limiting an amount of the load current by controlling the semiconductor element, wherein:
   the amount of the load current is limited to a first limiting level when the amount of the load current detected by the current detector exceeds a predetermined current level, and to a second limiting level, which is lower than the first limiting level, when the amount of current detected by the current detector exceeds the predetermined current level and the load voltage detected by the voltage detector becomes lower than a predetermined voltage level.

2. A load-driving device comprising:
   a semiconductor element connected in series to a load for supplying a driving current thereto in a controlled manner;
   a current detector for detecting an amount of a load current supplied to the load;
   a voltage detector for detecting a load voltage applied to the load; and
   means for limiting an amount of the load current by controlling the semiconductor element, wherein:
   the amount of the load current is limited to a first limiting level when the amount of the load current detected by the current detector exceeds a predetermined current level, and to a second limiting level, which is lower than the first limiting level, when a load resistance detected based on the load current detected by the current detector and the load voltage detected by the voltage detector becomes lower than a predetermined threshold level.

3. The load-driving device as in claim 2, wherein:
the load current is detected based on a voltage across a current-detecting resistor through which the load current flows; and
it is determined that the load resistance becomes lower than the predetermined threshold level when the voltage across the current-detecting resistor becomes higher than a voltage obtained by dividing the load voltage by dividing resistors.

4. The load-driving device as in claim 1, wherein:
the limiting means cuts off current supply to the load when the load current continues to exceed the predetermined current level for a predetermined period.

5. The load-driving device as in claim 2, wherein:
the limiting means cuts off current supply to the load when the load current continues to exceed the predetermined current level for a predetermined period.

6. The load-driving device as in claim 1, wherein:
the load is a motor for driving a fan mounted on an automotive vehicle.

7. The load-driving device as in claim 2, wherein:
the load is a motor for driving a fan mounted on an automotive vehicle.

8. A method of controlling an amount of current supplied to a load that is driven by a load-driving device having a semiconductor element connected in series to the load for supplying a driving current thereto, a current detector for detecting an amount of a load current supplied to the load, a voltage detector for detecting a load voltage applied to the load and a current limiting circuit for limiting an amount of the load current, the method comprising:
detecting the load current by the current detector;
detecting the load voltage by the voltage detector;
limiting the load current to a first limiting level when the amount of the load current detected by the current detector exceeds a predetermined current level; and
limiting the load current to a second limiting level, which is lower than the first limiting level, when the amount of the load current detected by the current detector exceeds the predetermined current level and the load voltage detected by the voltage detector becomes lower than a predetermined voltage level.

9. A method of controlling an amount of current supplied to a load that is driven by a load-driving device having a semiconductor element connected in series to the load for supplying a driving current thereto, a current detector for detecting an amount of a load current supplied to the load, a voltage detector for detecting a load voltage applied to the load and current limiting means for limiting an amount of the load current, the method comprising:
detecting the load current;
detecting the load voltage;
limiting the load current to a first limiting level when the amount of the load current exceeds a predetermined current level; and
limiting the load current to a second limiting level, which is lower than the first limiting level, when a load resistance of the load determined based on the load current and the load voltage becomes lower than a predetermined threshold level.

10. The method as in claim 9, wherein:
the load current is detected based on a voltage across a current-detecting resistor through which the load current flows; and
it is determined that the load resistance becomes lower than the predetermined threshold level when the voltage across the current-detecting resistor becomes higher than a voltage obtained by dividing the load voltage by dividing resistors.

11. The method as in claim 8, wherein:
current supply to the load is terminated when the load current continues to exceed the predetermined current level for a predetermined period.

12. The method as in claim 9, wherein:
current supply to the load is terminated when the load current continues to exceed the predetermined current level for a predetermined period.

13. The method as in claim 8, wherein:
the load is a motor for driving a fan mounted on an automotive vehicle.

14. The method as in claim 9, wherein:
the load is a motor for driving a fan mounted on an automotive vehicle.

* * * * *